(12) United States Patent
Ishihara et al.

(10) Patent No.: US 9,748,814 B2
(45) Date of Patent: Aug. 29, 2017

(54) ASSEMBLY METHOD OF AN INLINE TYPE FAN MOTOR

(71) Applicant: Sanyo Denki Co., Ltd., Tokyo (JP)

(72) Inventors: Katsumichi Ishihara, Tokyo (JP); Masashi Nomura, Tokyo (JP); Tomoko Hayashi, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 530 days.

(21) Appl. No.: 14/289,721

(22) Filed: May 29, 2014

(65) Prior Publication Data
US 2014/0354117 A1 Dec. 4, 2014

(30) Foreign Application Priority Data
Jun. 4, 2013 (JP) ................ 2013-118075

(51) Int. Cl.
| | | |
|---|---|---|
| H02K 15/00 | (2006.01) | |
| H02K 5/22 | (2006.01) | |
| H02K 7/14 | (2006.01) | |
| H02K 15/14 | (2006.01) | |
| H02K 11/33 | (2016.01) | |

(52) U.S. Cl.
CPC .......... H02K 5/225 (2013.01); H02K 7/14 (2013.01); H02K 11/33 (2016.01); H02K 15/14 (2013.01); *H02K 2203/03* (2013.01); *Y10T 29/49009* (2015.01); *Y10T 29/49147* (2015.01); *Y10T 29/49155* (2015.01)

(58) Field of Classification Search
CPC H02K 2203/03; H02K 9/06; Y10T 29/49009; Y10T 29/49147; Y10T 29/49155

USPC .................. 29/596, 598, 831, 842
See application file for complete search history.

(56) References Cited

U.S. PATENT DOCUMENTS

| | | | |
|---|---|---|---|
| 5,278,468 A | 1/1994 | Escaravage et al. | |
| 7,828,519 B2 * | 11/2010 | Ishihara ................ | F04D 29/542 |
| | | | 415/191 |
| 7,847,463 B2 * | 12/2010 | Fujita ................... | H02K 21/044 |
| | | | 310/156.66 |
| 2007/0063600 A1 | 3/2007 | Fujii et al. | |
| 2008/0050232 A1 | 2/2008 | Ishihara et al. | |
| 2010/0019627 A1 | 1/2010 | Fujii et al. | |
| 2012/0020780 A1 | 1/2012 | Uchiyama et al. | |

FOREIGN PATENT DOCUMENTS

| | | |
|---|---|---|
| CN | 1941568 A | 4/2007 |
| CN | 201207756 Y | 3/2009 |
| CN | 102338124 A | 2/2012 |
| EP | 0521791 A1 | 1/1993 |
| JP | H10-322973 A | 12/1998 |

(Continued)

OTHER PUBLICATIONS

Official Notice of Reason for Refusal for Japanese Application No. 2013-118075 dated Jul. 15, 2014.

(Continued)

*Primary Examiner* — Thiem Phan
(74) *Attorney, Agent, or Firm* — Drinker Biddle & Reath LLP (57) ABSTRACT

Block components having a conductive property are mounted on lands for connection to a harness so as to increase the height of the lands on a circuit board which is to be connected to windings.

1 Claim, 10 Drawing Sheets

(56) References Cited

FOREIGN PATENT DOCUMENTS

| JP | 2005-192357 A | 7/2005 |
|----|---------------|--------|
| JP | 2012026291 A  | 2/2012 |

OTHER PUBLICATIONS

Extended Search Report for EP Application No. 14170630.9 dated Nov. 25, 2015.
Chinese Office Action for Application No. 201410231395.6, dated Jun. 30, 2017.

* cited by examiner

(12) United States Patent
US 9,748,814 B2

ASSEMBLY METHOD OF AN INLINE TYPE FAN MOTOR

RELATED APPLICATIONS

This application claims priority to Japanese Application No. 2013-118075, filed Jun. 4, 2013.

BACKGROUND

1. Technical Field

The present invention relates to a fan motor having a rotary motor incorporated in an impeller which includes a plurality of rotor blades, an inline type fan motor which includes a plurality of fan motors arranged in series in a rotation axis direction of the rotary motor and an assembly method of the same.

2. Description of Related Art

A fan motor includes a rotary motor as a rotation drive device, an impeller which includes a plurality of rotor blades that are mounted on a rotary shaft of the rotary motor, and a venturi casing in a cylindrical shape which works along with the impeller to generate an axial flow.

An axial flow fan motor generally has air blowing characteristics of a large air flow amount and a small static pressure. In order to improve the air blowing characteristics of the axial flow fan motor, a variety of inline type fan motors have been proposed which have a plurality of axial flow fan motors arranged in series in the rotation axis direction of the rotary motor.

As a technique on the inline type fan motor, Japanese Unexamined Patent Application Publication No. 2012-26291 discloses an axial flow fan which includes a first axial flow fan, a first flow control grid, a second axial flow fan and a second flow control grid, which are arranged in series in an air flow direction, in sequence from the upstream end.

Furthermore, a circuit board is disposed in a frame of the fan motor. The circuit board has a wiring pattern for controlling the fan motor. Leads of the wire harness for connecting an external power supply are soldered to lands of the circuit board.

The circuit board is often disposed at a position recessed from a frame surface. Particularly, in a small fan motor having a small inner diameter of the frame, soldering the leads to the lands of the circuit board while the circuit board is incorporated in the frame is extremely difficult.

In such a small inline type fan motor, the leads are soldered to the lands of the circuit board outside the frame of the fan motor. After that, the circuit board is incorporated into the frame of each fan motor, and accordingly, a plurality of fan motors are assembled in series.

Moreover, when the wire harness has a short lead length, the leads are removed from the connector to perform soldering on the circuit board since handling of the leads are difficult. After that, the circuit board is incorporated into the frame of each fan motor, and accordingly, a plurality of fan motors are assembled in series.

As a result, many processes are needed for assembly of the conventional inline type fan motors, leading to increased cost in manufacturing the inline type fan motors.

SUMMARY

The present invention provides a fan motor, an inline type fan motor and an assembly method of the same which allow for manufacturing of the inline type fan motor with a low cost by reducing processes for assembly of the inline type fan motor.

A fan motor according to an aspect of the present invention includes a stator around which a winding is wound, a rotor that includes a permanent magnet and is configured to rotate along the stator, and an impeller that is fixed on the rotor and includes a plurality of rotor blades.

A block component having a conductive property is mounted on a land for connection to a harness so as to increase a height of the land on a circuit board which is to be connected to the winding.

An inline type fan motor according to another aspect of the present invention includes a plurality of fan motors according to the above aspect which are connected in series in an axial direction of a rotary shaft of a rotary motor.

Further, the inline type fan motor according to the above aspect are assembled by connecting the plurality of fan motors in series in the rotation axis direction of the rotary motor.

An assembly method of an inline type fan motor according to another aspect of the present invention includes steps of mounting a block component having a conductive property on a circuit board, integrating the circuit board with a stator, incorporating the stator having the circuit board into a frame, soldering a lead of a harness to the block component on the circuit board while the circuit board is incorporated in the frame, and assembling the plurality of fan motors in series with the harness mounted.

In the fan motor according to the above aspects, the block component having a conductive property is mounted on the land of the circuit board. Since the block component increases the height of the land, the lead of the harness can be soldered to the circuit board while the circuit board is incorporated in frame.

Accordingly, a fan motor, an inline type fan motor and assembly method of the same according to the aspects of the present invention allow for manufacturing of the inline type fan motor with a low cost by reducing processes for assembly of the inline type fan motor.

DETAILED DESCRIPTION

A fan motor, an inline type fan motor and an assembly method of the same according to the present embodiment will be described below with reference to the drawings.

In the fan motor, the inline type fan motor and the assembly method of the same according to the present embodiment, a configuration of a land of a circuit board is improved so that leads of a harness can be soldered to the circuit board while the circuit board is incorporated in a frame. According to the present embodiment, processes for assembling the inline type fan motor can be reduced compared to those of the conventional example, thereby achieving a low cost inline type fan motor.

Configuration of Fan Motor

Figure 1:
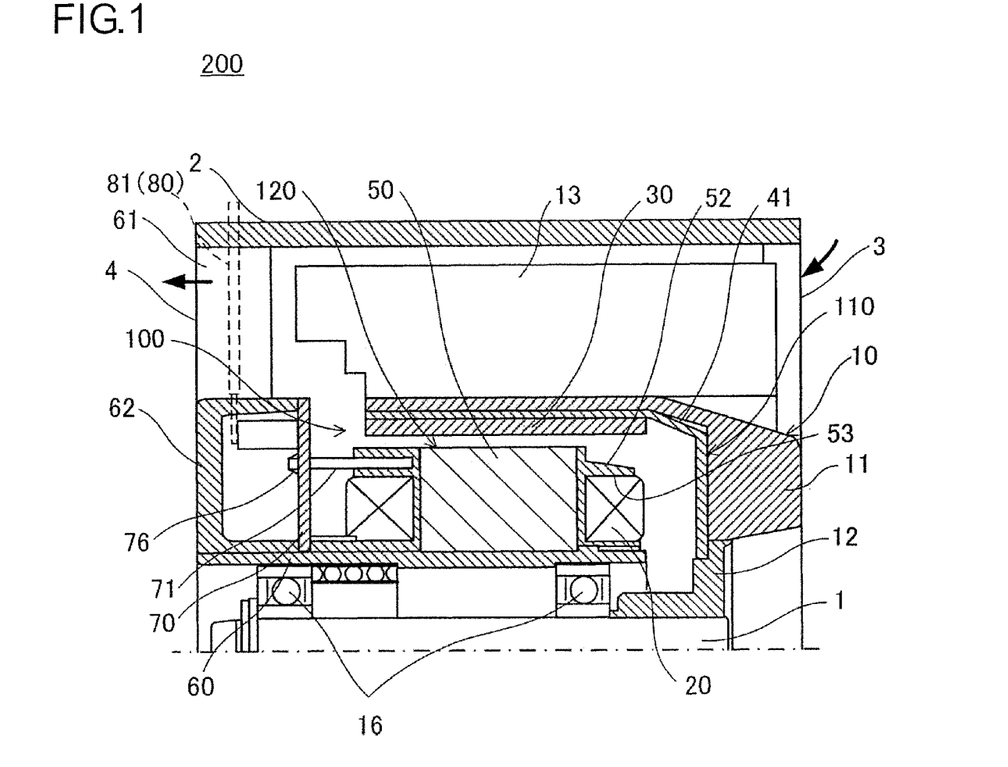
FIG. 1 is a sectional view of a fan motor according to the present embodiment.
Figure 2:
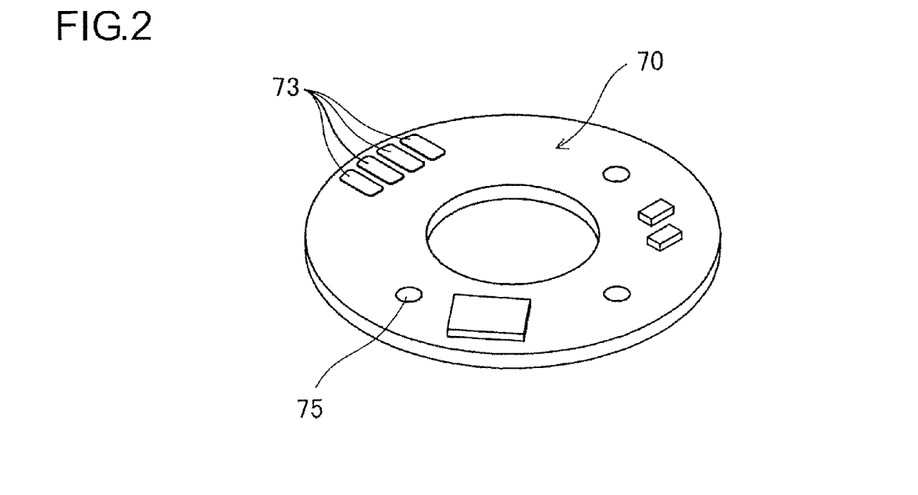
FIG. 2 is a perspective view of a circuit board according to the present embodiment before block components are mounted.
Figure 3:
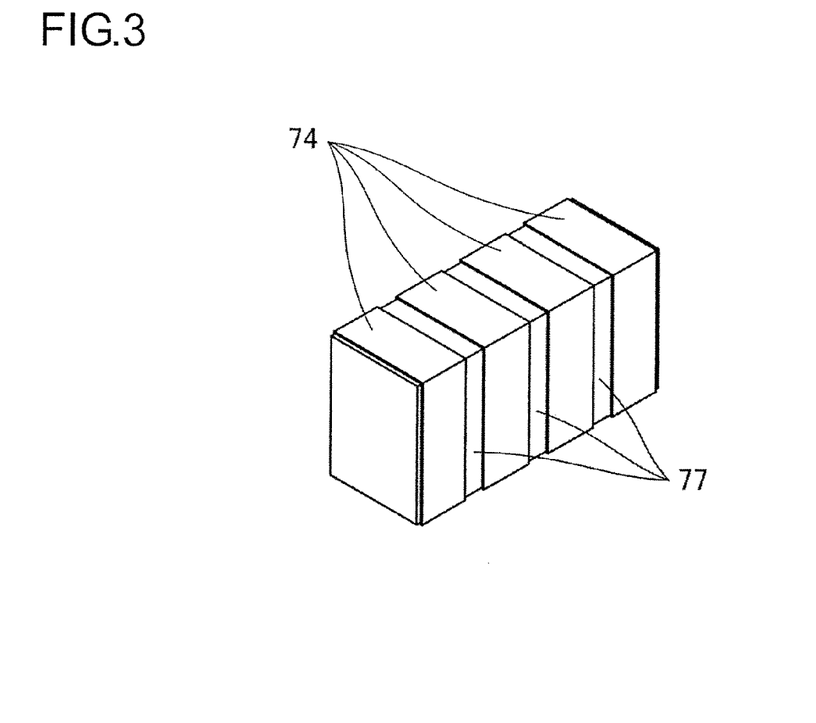
FIG. 3 is a perspective view of the block components according to the present embodiment.
Figure 4:
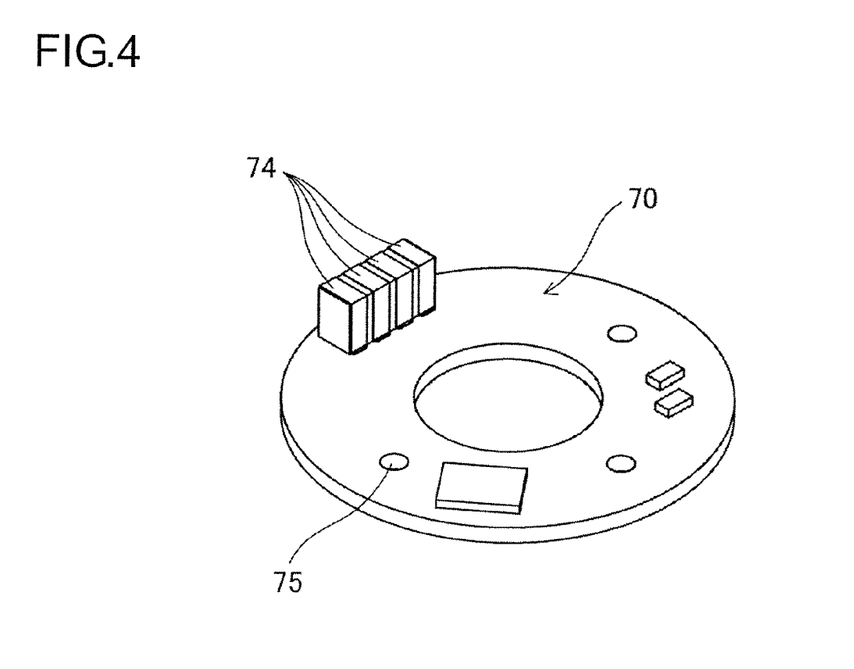
FIG. 4 is a perspective view of the circuit board according to the present embodiment after the block components are mounted.

First, a configuration of the fan motor according to the present embodiment will be described below with reference to FIGS. 1 and 2. FIG. 1 is a sectional view of the fan motor according to the present embodiment. FIG. 2 is a perspective view of the circuit board according to the present embodiment before block components are mounted. FIG. 3 is a perspective view of the block components according to the present embodiment. FIG. 4 is a perspective view of the circuit board according to the present embodiment after the block components are mounted.

The fan motor is an air blowing device that intakes air from one side of the axial direction of a rotary shaft and exhausts air to the other side of the axial direction by rotating an impeller which is mounted on the rotary shaft of the rotary motor.

As shown in FIG. 1, a fan motor 200 includes an impeller 10 fixed on a rotary shaft 1, and a venturi casing (hereinafter, simply referred to as "casing") 2 which surrounds a radial outer periphery of the impeller 10.

The impeller 10 includes a cup-shaped hub 11 in the center portion. A plurality of rotor blades 13 are disposed on the outer periphery of the hub 11. The hub 11 is fixed on the rotary shaft 1 via a socket 12.

A rotary motor 100 as a rotation drive device of the impeller 10 is disposed in the hub 11. The rotary motor 100 according to the present embodiment is, for example, an outer rotor brushless motor. The rotary motor 100 includes an inner stator 120 which is an armature having windings 20 and an outer rotor 110 which is an excitation section having a permanent magnet 30 on the outer circumference of the stator 120.

The plurality of rotor blades 13 are mounted in a radial fashion on the periphery of the hub 11 of the impeller 10. The rotor blades 13 are arranged inclined to the axial direction of the rotary shaft 1.

The impeller 10 generates an air flow between the rotor 110 and the casing 2 by rotation of the impeller 10. The rotor blades 13 of the impeller 10 according to the present embodiment are shaped and configured to generate an air flow which flows in the direction from the hub 11 of the impeller 10 to a frame boss 62.

The frame boss 62 is generally formed in a cup shape and serves as a base of the stator 120. The frame boss 62 and the hub 11 of the impeller 10 are positioned on the opposite sides in the axial direction of the rotary shaft 1.

The rotor 110 includes a generally cup-shaped rotor yoke (rotor cover) 41, the rotary shaft 1 which is press fitted by a socket 12 in the center portion of the rotor yoke 41, the permanent magnet 30 and the like. The stator 120 includes a stator stack 50, the windings 20 and the like.

The rotor yoke 41 is fitted in the hub 11. The permanent magnet 30 is securely attached on the inner peripheral surface of the rotor yoke 41 which extends in the axial direction. The rotor yoke 41 has a function to close the magnetic force line from the excitation section and maximize an electromagnetic induction effect of the permanent magnet 30.

The rotor yoke 41 may be made of an iron magnetic material such as carbon steel for machine structural use, but any other material may be used.

The rotary shaft 1 is rotatably supported by a bearing 16. The bearing 16 is mounted on the inner surface of a cylindrically-shaped bearing support 60. The bearing support 60 is formed at the center of the frame boss 62.

A stator stack 50 is fixed on the outer surface of the bearing support 60. The stator stack 50 is formed of a plurality of thin ring-shaped metal plates which are stacked in the plate thickness direction. The metal plates of the stator stack 50 are preferably made of, for example, silicon steel in terms of performance and cost. The metal plates of the stator stack 50 are stacked, for example, by mechanically bringing into press contact with each other.

Insulators 52 are provided to project on the stator stack 50. Slots 53 in the form of recesses are defined between the insulators 52. The slots 53 are arranged at equal intervals in the circumferential direction of the stator stack 50. The windings 20 wound around the stator stack 50 are housed in the slots 53.

The frame boss 62 and the casing 2 are connected by a frame 61. The frame boss 62 supports a circuit board (printed circuit board) 70. The circuit board 70 has a wiring pattern for controlling the fan motor 200.

The windings 20 wound around the stator stack 50 and the circuit board 70 are connected by connection terminals 71. The connection terminals 71 allow the connecting wires of the windings 20 to be collectively connected to the circuit board 70.

As shown in FIGS. 1 through 4, block components 74 are mounted on lands 73 which are to be connected to an external power source of the circuit board 70. The block components 74 are provided to increase the height of the lands 73. The block components 74 are conductive components and are provided to increase the thickness of the lands 73. Corresponding to a planar shape of the lands 73, four block components 74 are arranged side by side with electric insulation members 77 interposed therebetween. Leads 81 of the harness 80 to be connected to an external power source are soldered to the block components 74.

In the present embodiment, the block components 74 are made of a conductive material such as copper and aluminum which is the same as that of the land 73, but any other material may be used.

The circuit board 70 has through holes 75 through which the connection terminals 71 for electrically connecting to the windings 20 are inserted. A portion of the connection terminal 71 which is projected from the through hole 75 is connected by solder 76 (see FIG. 1).

Referring again to FIG. 1, the casing 2 defines an air channel which guides air flow, and also an intake port 3 and an exhaust port 4 for air flow at both ends. The casing 2 is integrally formed with the frame 61 having a flange which is not shown in the figure.

Configuration of Inline Type Fan Motor

Figure 5:
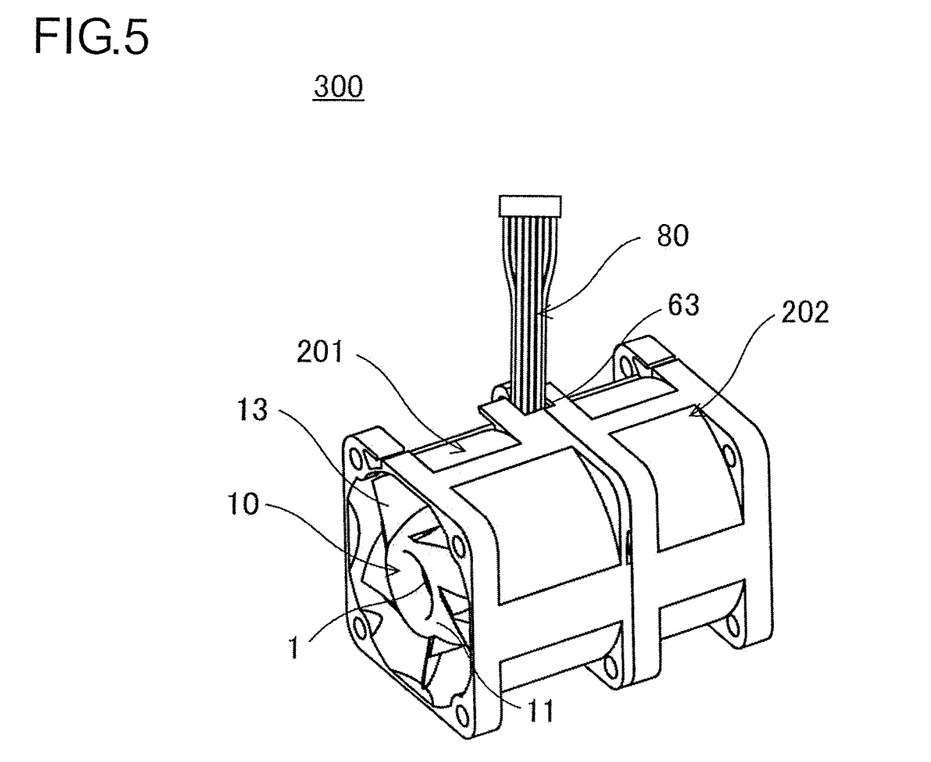
FIG. 5 is a perspective view of an inline type fan motor according to the present embodiment.

Next, with reference to FIG. 5, a configuration of the inline type fan motor according to the present embodiment will be described. FIG. 5 is a perspective view of the inline type fan motor according to the present embodiment.

As shown in FIG. 5, in an inline type fan motor 300 according to the present embodiment, at least a first fan motor 201 and a second fan motor 202 are connected in series in the axial direction of the rotary shaft 1 of the rotary motor 100. The first fan motor 201 is disposed on the intake side, while the second fan motor 202 is disposed on the exhaust side. Although two fan motors 200 are connected in series in the present embodiment, the invention is not limited thereto and three or more fan motors 200 may be connected in series.

In the present embodiment, the first fan motor 201 has a length in the axial direction which is longer than that of the second fan motor 202. A stator blade (flow control grid), which is not shown in the figure, is provided at the exhaust port of the first fan motor 201 which is provided on the intake side of the inline type fan motor 300.

That is, in the inline type fan motor 300 of the present embodiment, the rotor blade 13 of the first fan motor 201, the stator blade (flow control grid), and the rotor blade 13 of the second fan motor 202 are disposed in series in the air flow direction in the cylindrically-shaped casings 2, 2 which are connected in series. Further, the stator blade (flow control grid) may also be disposed at the exhaust port of the second fan motor 202.

The configuration of the first fan motor 201 is generally the same as that of the second fan motor 202 except that the first fan motor 201 has the stator blade (flow control grid) and that the circuit boards 70, 70 are disposed so as to oppose each other.

That is, although the detailed inner configuration will not be described herein, positions of the rotor 110 and the stator 120 having the circuit board 70 in the first fan motor 201 are opposite of those in the second fan motor 202. Although the positions of the inner configuration of the first fan motor 201 and the second fan motor 202 are opposite to each other, the orientation or rotation of the rotor blades 13 is configured to allow the fan motors 201, 202 connected in series to generate a continuous air flow which flows in the same direction.

Effect of the Fan Motor and the Inline Type Fan Motor, and Assembly Method of the Inline Type Fan Motor With reference to FIGS. 1 through 17, the effect of the fan motor 200 and the inline type fan motor 300 of the present embodiment as well as the assembly method of the inline type fan motor 300 of the present embodiment will be described.

As shown in FIGS. 1 and 5, two fan motors 200 of the present embodiment, for example, are connected in series and form the inline type fan motor 300. The assembly method of the inline type fan motor 300 will be described later.

The inline type fan motor 300 is mounted on a housing of an electronic equipment or the like by threading a mounting screw into an intake side flange or an exhaust side flange of the frame 61 via the housing.

For example, when the inline type axial flow fan motor 300 is used as a cooling fan for a server, the intake side flange is mounted on a fan mounting section on the inner surface of the housing of the server.

The first fan motor 201 and the second fan motor 202 rotate, for example, in the opposite directions. When the impellers 10, 10 of the first fan motor 201 and the second fan motor 202 rotate, air is drawn through the intake port 3 of the first fan motor 201.

The air drawn through the intake port 3 of the first fan motor 201 passes through, in sequence, the rotor blade 13 of the first fan motor 201, the stator blade of the first fan motor 201, and the rotor blade 13 of the second fan motor 202, and is exhausted through the exhaust port 4 of the second fan motor 202.

Figure 6:
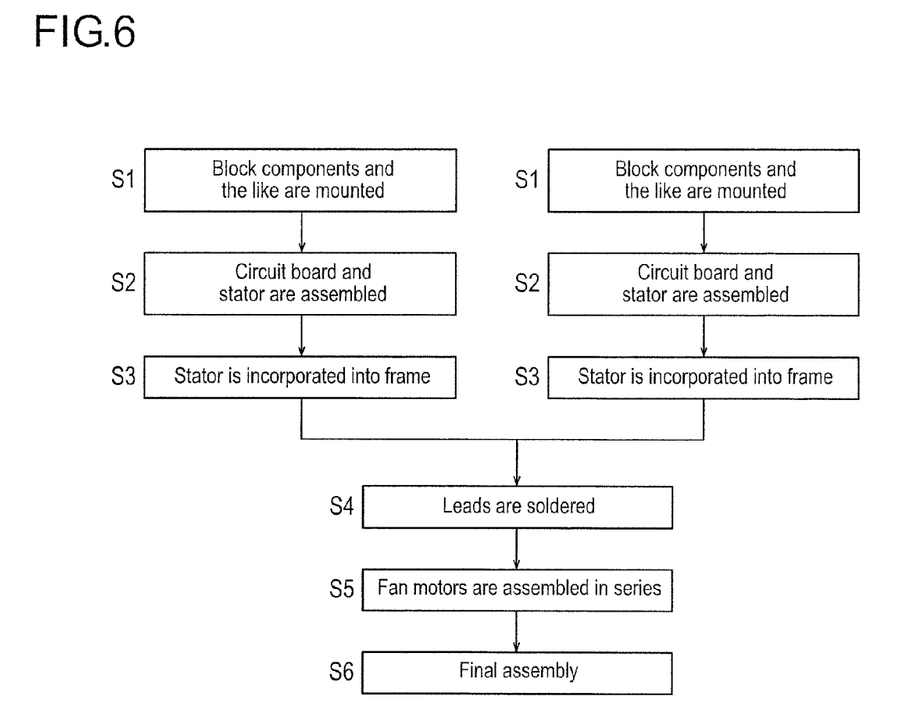
FIG. 6 is an assembly process chart of the inline type fan motor according to the present embodiment.
Figure 7:
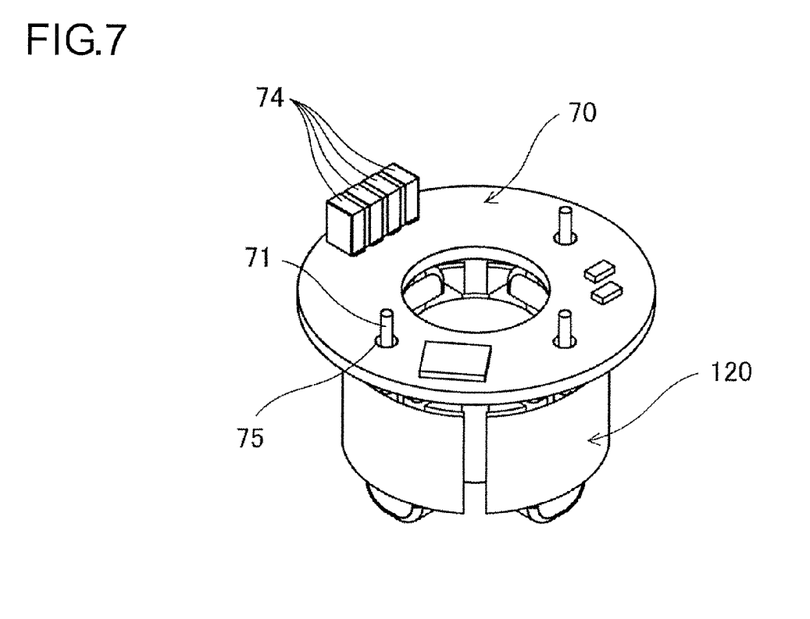
FIG. 7 is a perspective view which shows that a circuit board and a stator are assembled in an assembly method of the inline type fan motor according to the present embodiment.
Figure 8:
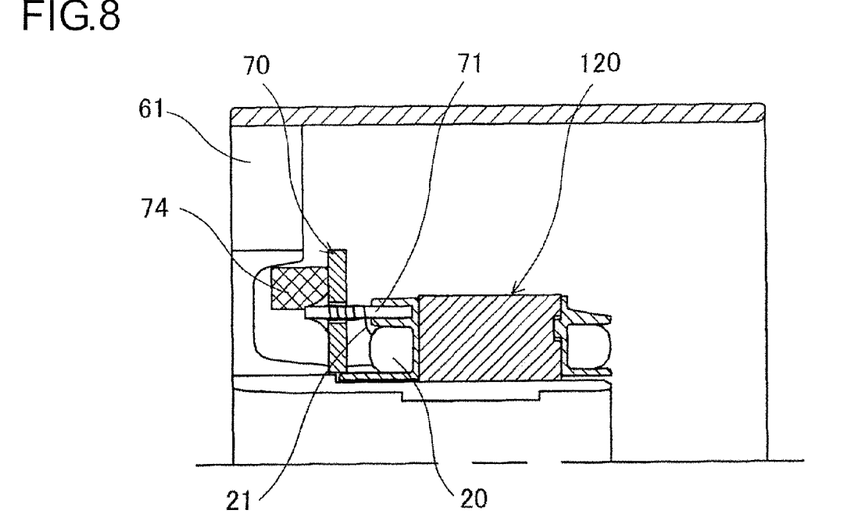
FIG. 8 is a sectional view which shows that the stator having the circuit board is assembled in a frame in the assembly method of the inline type fan motor according to the present embodiment.
Figure 9:
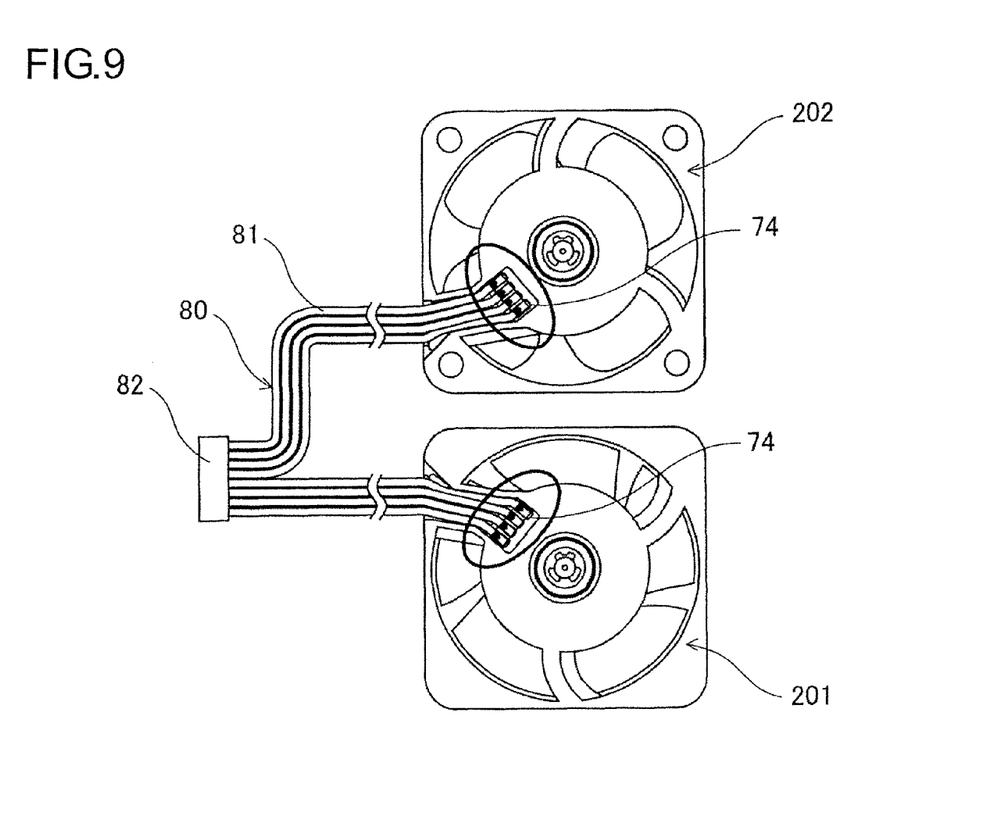
FIG. 9 is a schematic view which shows that leads are connected to the block components of the circuit boards of the respective fan motors in the assembly method of the inline type fan motor according to the present embodiment.

Next, with reference to FIGS. 5 through 9, the assembly method of the inline type fan motor 300 according to the present embodiment will be described in comparison with the assembly method of a conventional inline type fan motor. FIG. 6 is an assembly process chart of the inline type fan motor according to the present embodiment. FIG. 7 is a perspective view which shows that a circuit board and a stator are assembled in the assembly method of the inline type fan motor according to the present embodiment. FIG. 8 is a sectional view which shows that the stator having the circuit board is assembled in the frame in the assembly method of the inline type fan motor according to the present embodiment. FIG. 9 is a schematic view which shows that the leads are connected to the block components of the circuit boards of the respective fan motors in the assembly method of the inline type fan motor according to the present embodiment.

As shown in FIG. 6, the assembly method of the inline type fan motor 300 according to the present embodiment includes steps of mounting the block components on the circuit board (step 1; hereinafter, referred to as "S1"), integrating the circuit board with the stator (S2), incorporating the stator having the circuit board into the frame to assemble the fan motor (S3), soldering the leads of the harness to the circuit board disposed in the frame (S4), assembling a plurality of fan motors in series with the harness mounted (S5), and final assembly (S6).

That is, as shown in FIGS. 2 through 4, in the assembly method of the inline type fan motor 300 according to the present embodiment, the block components 74 are first mounted on the circuit boards 70, 70 of the respective fan motors 201, 202 (S1). Mounting of the block components 74 is automatically performed by using a mounting device. During mounting of the block components 74, other electronic components are also mounted.

Then, as shown in FIG. 7, the circuit board 70 on which the block components 74 are mounted is integrated with the stator 120 (S2). In this step, the connection terminals 71 connected to the windings 20 of the stator 120 are inserted into the through holes 75 of the circuit board 70, and the portions of the connection terminals 71 projected from the through holes 75 are connected by solder 76 (see FIG. 1). Further, the connecting wires 21 of the windings 20 of the stator 120 are collectively connected to the connection terminals 71 (see FIG. 8).

Then, as shown in FIG. 8, the stator 120 having the circuit board 70 is incorporated into the frame 61 so that the fan motors 201, 202 are assembled (S3). Although the rotor 110 is not incorporated in step 3, the invention is not limited thereto and the rotor 110 may be incorporated into the frame 61 during incorporating of the stator 120.

Then, as shown in FIGS. 8 and 9, the leads 81 of the harness 80 are soldered to the block components 74 of the circuit board 70 while the circuit board 70 is incorporated in the frame 61 of each of the fan motors 201, 202 (S4). In FIG. 9, reference number 82 denotes a connector of the harness 80.

Then, the rotor 110 is incorporated into the frame 61.

Finally, as shown in FIG. 5, the harness 80 connected to the first fan motor 201 and the second fan motor 202 is inserted into a harness insertion port 63 which is formed at the interface between the frames 61. Accordingly, the first fan motor 201 and the second fan motor 202 are connected in series, and assembly of the inline type fan motor 300 according to the present embodiment is completed (S6, see FIG. 1).

Comparison Example 1

Figure 10:
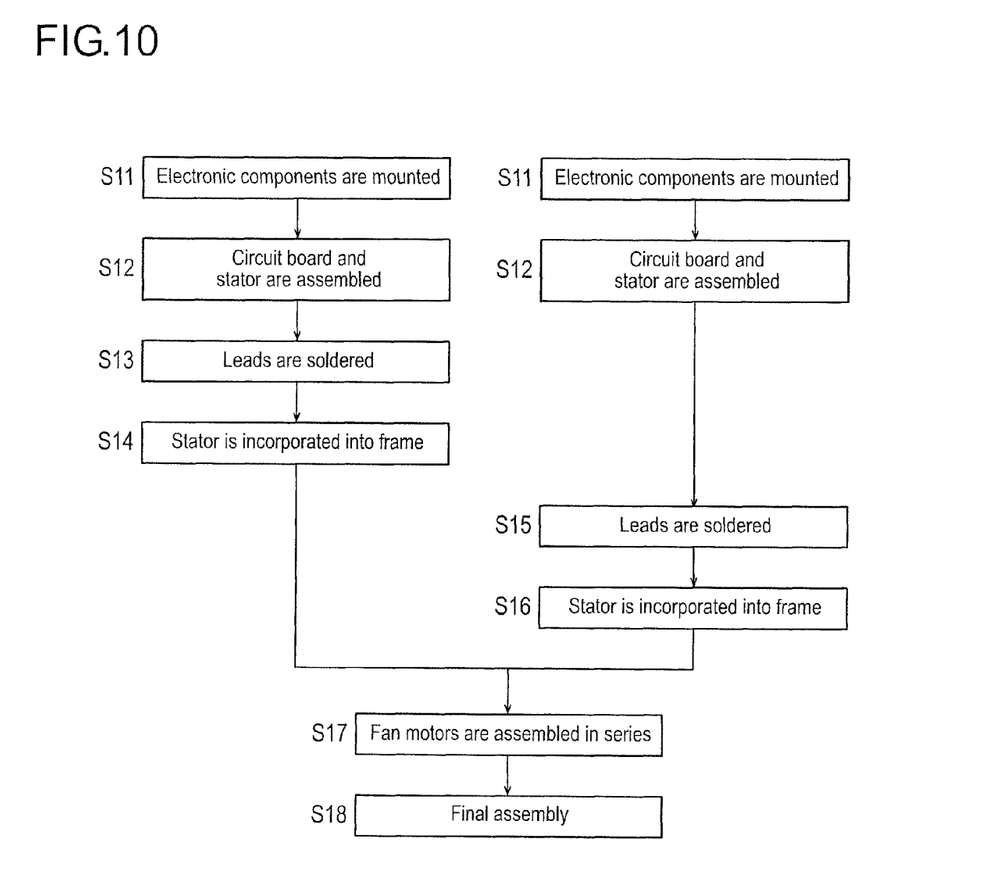
FIG. 10 is an assembly process chart in a comparison example 1 in which a harness has a long lead length.
Figure 11:
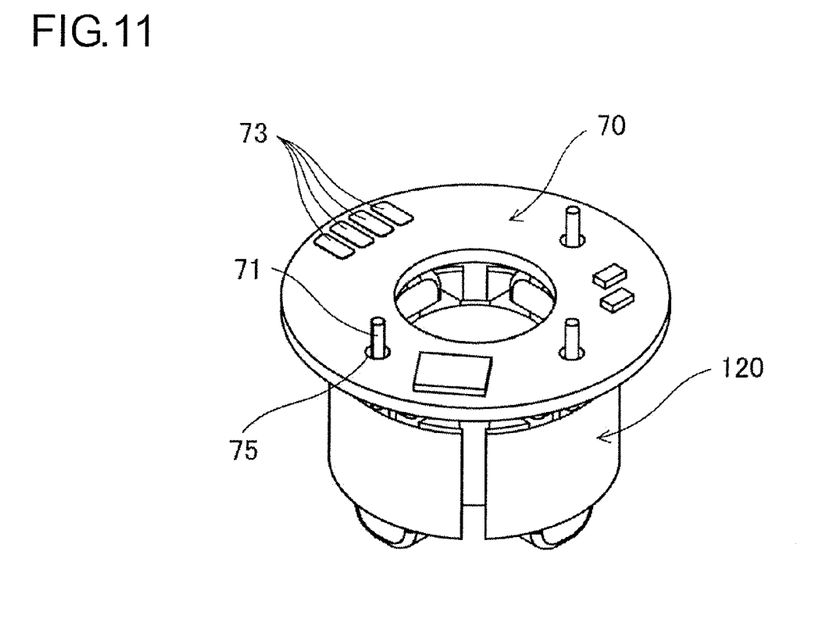
FIG. 11 is a perspective view of the comparison example 1 which shows that the circuit board and the stator are assembled.
Figure 12:
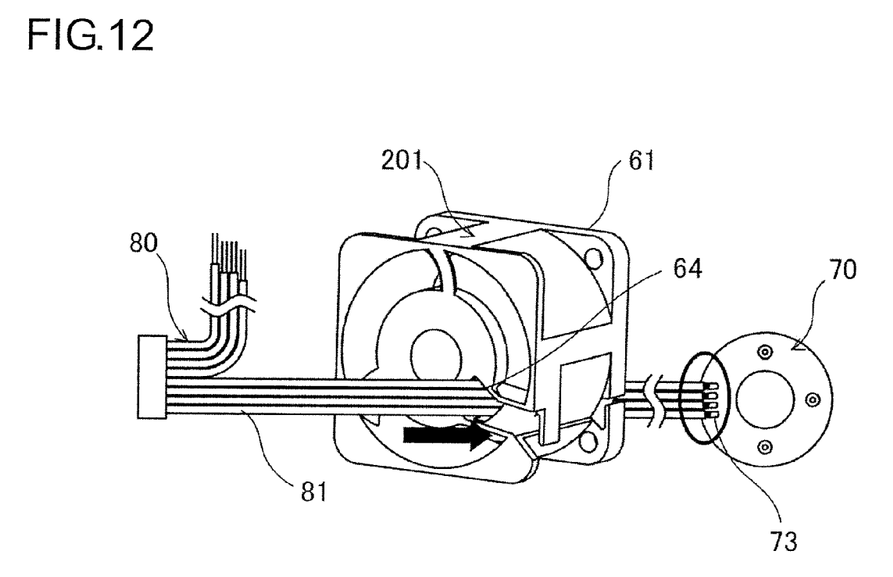
FIG. 12 is a perspective view of the comparison example 1 which shows that the leads are connected to the circuit board outside the frame of a first fan motor.
Figure 13:
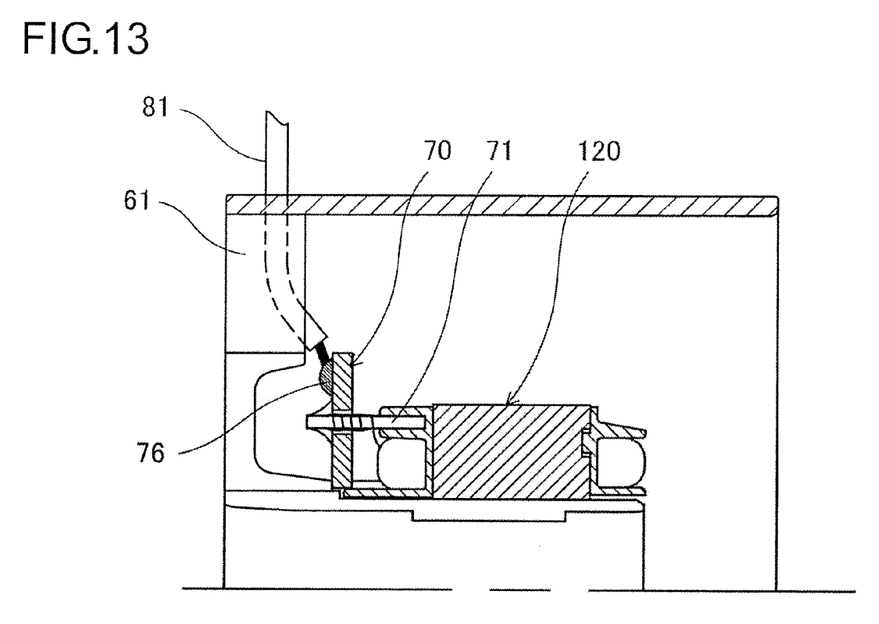
FIG. 13 is a perspective view of the comparison example 1 which shows that the stator having the circuit board with the leads connected is incorporated in the frame.
Figure 14:
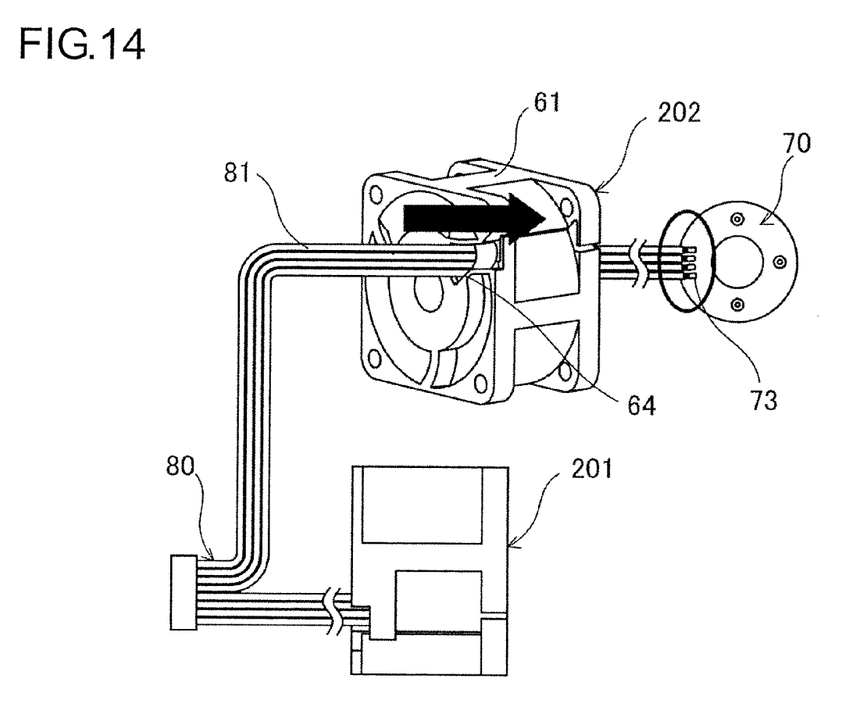
FIG. 14 is a perspective view of the comparison example 1 which shows that the leads are connected to the circuit board outside the frame of a second fan motor.

With reference to FIGS. 10 through 14, an assembly method of the conventional inline type fan motor according in which the harness has a long lead length will be described as a comparison example 1. FIG. 10 is an assembly process chart in a comparison example 1 in which the harness has a long lead length. FIG. 11 is a perspective view of the comparison example 1 which shows that the circuit board and the stator are assembled. FIG. 12 is a perspective view of the comparison example 1 which shows that the leads are connected to the circuit board outside the frame of the first fan motor. FIG. 13 is a perspective view of the comparison example 1 which shows that the stator having the circuit board with the leads connected is incorporated in the frame. FIG. 14 is a perspective view of the comparison example 1 which shows that the leads are connected to the circuit board outside the frame of the second fan motor. In FIGS. 10 through 14, the same reference numbers are used to refer to the components having the same configuration as those of the inline type axial flow fan motor 300 according to the present embodiment.

First, the assembly method of the conventional inline type fan motor in which the harness has a long lead length will be described.

When the harness has a long lead length, as shown in FIG. 10, the assembly method of the conventional inline type fan motor includes steps of, in sequence, mounting electronic components on the circuit board (S11), integrating the circuit board with the stator (S12), inserting the leads of the harness into a frame window of the first fan motor and soldering the leads to the circuit board outside the frame (S13), and incorporating the stator having the circuit board with the leads soldered into the frame of the first fan motor (S14). Further, the assembly method of the conventional inline type fan motor includes steps of, in sequence, inserting the leads of the harness into a frame window of the second fan motor and soldering the leads to the circuit board outside the frame (S15), incorporating the stator having the circuit board with the leads soldered into the frame of the second fan motor (S16), assembling a plurality of fan motors in series with the harness mounted (S17), and final assembly (S18).

That is, when the harness has a long lead length, in the assembly method of the conventional inline type fan motor, the electronic components are first mounted on the circuit boards 70, 70 of the respective fan motors 201, 202 (S11, same as the FIG. 2). Mounting of the electronic components is automatically performed by using a mounting device.

Then, as shown in FIG. 11, the circuit board 70 on which the electronic components are mounted is integrated with the stator 120 (S12). As described above, the connection terminals 71 connected to the windings 20 of the stator 120 are inserted into the through holes 75 of the circuit board 70, and the portions of the connection terminals 71 projected from the through holes 75 are soldered.

Then, as shown in FIG. 12, one group of the leads 81 of the harness 80 is inserted through a frame window 64 of the first fan motor 201 and is led out to the outside of the frame 61. Then, the leads 81 are connected by solder 76 to the lands 73 of the circuit board 70 outside the frame 61 (S13).

Then, as shown in FIG. 13, the stator 120 having the circuit board 70 with the leads 81 soldered is incorporated into the frame 61 of the first fan motor 201 (S14).

Then, as shown in FIG. 14, the other group of the leads 81 of the harness 80 is inserted through the frame window 64 of the second fan motor 202 and is led out to the outside of the frame 61. Then, the leads 81 are connected by solder 76 to the lands 73 of the circuit board 70 outside the frame 61 (S15).

Then, the stator 120 having the circuit board 70 with the leads 81 connected by solder 76 is incorporated into the frame 61 of the second fan motor 202 (S16, same as the FIG. 13).

Then, the rotor 110 is incorporated into the frame 61 (S17).

Finally, the harness 80 connected to the first fan motor 201 and the second fan motor 202 is inserted into the harness insertion port 63 which is formed at the interface between the frames 61 (same as FIG. 5). Accordingly, the first fan motor 201 and the second fan motor 202 are connected in series, and assembly of the inline type fan motor 300 according to the present embodiment is completed (S18).

Comparison Example 2

Figure 15:
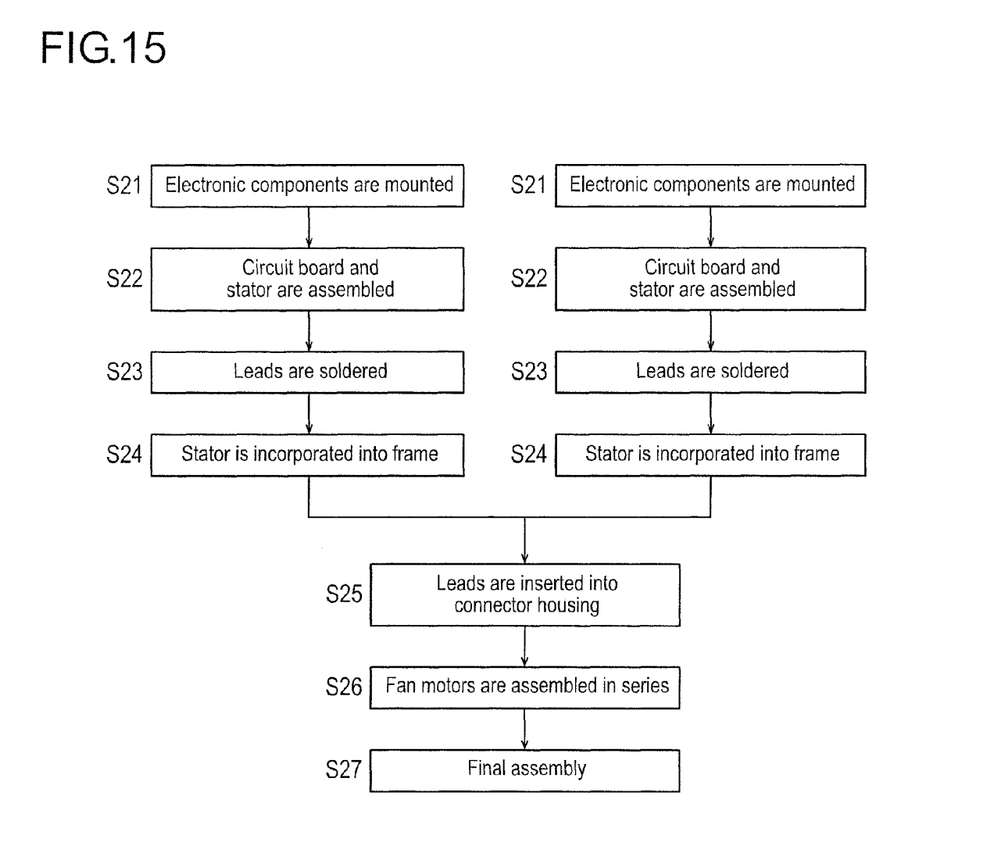
FIG. 15 is an assembly process chart of a comparison example 2 in which a harness has a short lead length.
Figure 16:
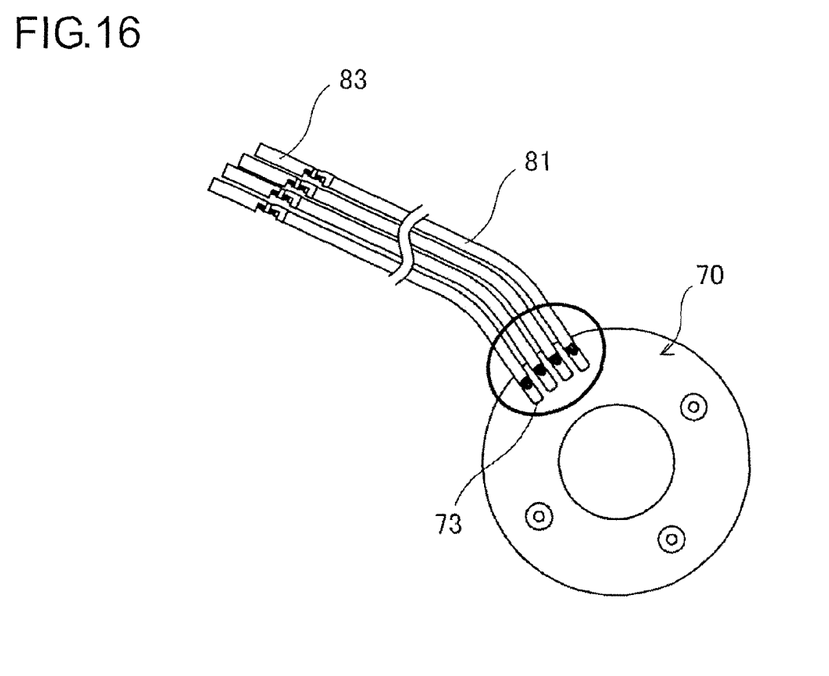
FIG. 16 is a perspective view of the comparison example 2 which shows that the leads with harness terminals fixedly attached are soldered to the circuit board.
Figure 17:
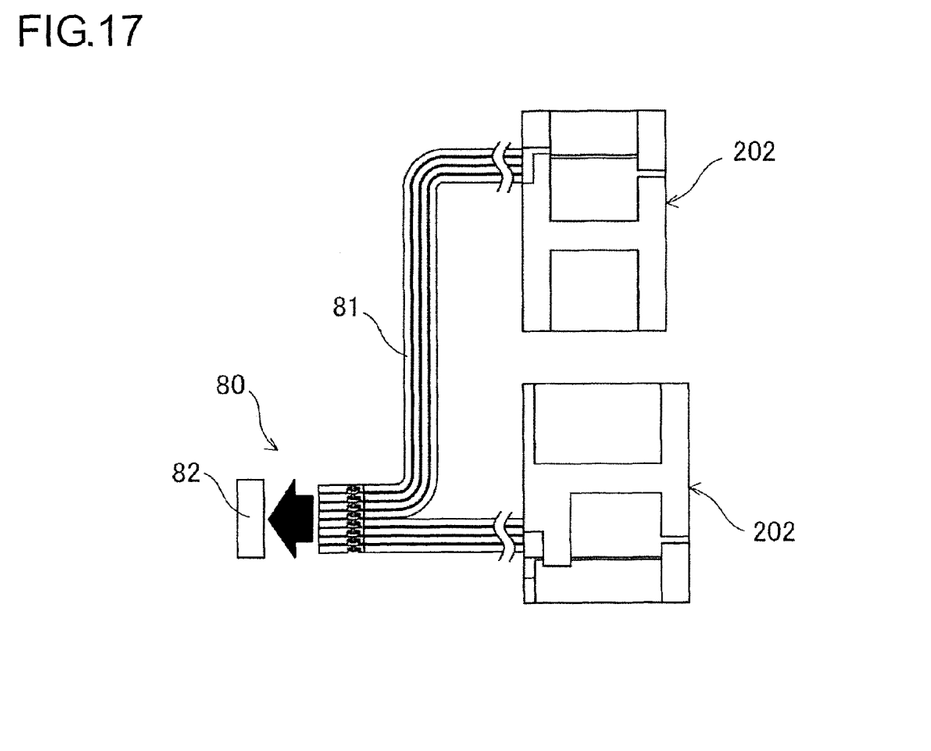
FIG. 17 is a perspective view of the comparison example 2 which shows that the lead terminals are inserted into a connector housing.

With reference to FIGS. 15 to 17, an assembly method of the conventional inline type fan motor according in which the harness has a short lead length will be described as a comparison example 2. FIG. 15 is an assembly process chart of a comparison example 2 in which a harness has a short lead length. FIG. 16 is a perspective view of the comparison example 2 which shows that the leads with harness terminals fixedly attached are soldered to the circuit board. FIG. 17 is a perspective view of the comparison example 2 which shows that the lead terminals are inserted into a connector housing. In FIGS. 15 through 17, the same reference numbers are used to refer to the components having the same configuration as those of the inline type axial flow fan motor 300 according to the present embodiment.

When the harness has a short lead length, as shown in FIG. 15, the assembly method of the conventional inline type fan motor includes steps of, in sequence, mounting electronic components on the circuit board (S21), integrating the circuit board with the stator (S22), soldering the leads with the harness terminals fixedly attached (S23), and incorporating the stator having the circuit board with the leads soldered into the frame (S24). Further, the assembly method of the conventional inline type fan motor includes steps of, in sequence, inserting the lead terminals into the connector housing (S25), assembling a plurality of fan motors in series with the harness mounted (S26), and final assembly (S27).

That is, when the harness has a short lead length, in the assembly method of the conventional inline type fan motor, the electronic components are first mounted on the circuit boards 70, 70 of the respective fan motors 201, 202 (S21, same as FIG. 2). Mounting of the electronic components is automatically performed by using a mounting device.

Then, the circuit board 70 on which the electronic components are mounted is integrated with the stator 120 (S22, same as FIG. 11). As described above, the connection terminals 71 connected to the windings 20 of the stator 120 are inserted into the through holes 75 of the circuit board 70, and the portions of the connection terminals 71 projected from the through holes 75 are soldered.

Then, as shown in FIG. 16, the leads 81 with the harness terminals fixedly attached are soldered to the lands 73 of the circuit board 70 which is integrated with the stator 120 (S23).

Then, the stator 120 having the circuit board 70 with the leads 81 connected by solder 76 is incorporated into the frame 61 of the fan motors 201, 202 (S24, same as FIG. 13).

Then, as shown in FIG. 17, terminals 83 of the leads 81 are inserted into the housing of the connector 82 (S25).

Then, the rotor 110 is incorporated into the frame 61 (S26).

Finally, the harness 80 connected to the first fan motor 201 and the second fan motor 202 is inserted into the harness insertion port 63 which is formed at the interface between the frames 61 (same as FIG. 5). Accordingly, the first fan motor 201 and the second fan motor 202 are connected in series, and assembly of the inline type fan motor 300 according to the present embodiment is completed (S27).

That is, in the fan motor 200 and the inline type fan motor 300 according to the present embodiment, the block components 74 having a conductive property are mounted on the lands 73 of the circuit board 70. Since the block component 74 increase the height of the lands 73, the leads 81 of the harness 80 can be soldered to the circuit board 70 while the circuit board 70 is incorporated in the frame 61.

According to the fan motor 200, the inline type fan motor 300 and the assembly method of the same of the present embodiment, the inline type fan motor 300 can be manufactured with a low cost by reducing processes for assembly of the inline type fan motor 300.

Although preferred embodiments of the invention are described above, those are provided for an explanation purpose and are not intended to limit the scope of the present invention to those embodiments. Other variations are possible without departing from the spirit of the invention.

What is claimed is:

1. An assembly method of an inline type fan motor which is assembled by connecting a plurality of fan motors in series in a rotation axis direction of a rotary motor, comprising:
   mounting a block component having a conductive property on a circuit board;
   integrating the circuit board with a stator;
   incorporating the stator having the circuit board into a frame;
   soldering a lead of a harness to the block component on the circuit board while the circuit board is incorporated in the frame; and
   assembling the plurality of fan motors in series with the harness mounted.

* * * * *